UNITED STATES PATENT OFFICE 2,272,057

RESIN EMULSION

Harold C. Cheetham, Philadelphia, Pa., assignor to The Resinous Products & Chemical Company, Philadelphia, Pa.

No Drawing. Application November 2, 1937, Serial No. 172,380

11 Claims. (Cl. 260—6)

This invention relates to improved aqueous emulsions of resins and to a process for producing them. It relates more particularly to emulsions of improved resins of the drying-oil modified alkyd type which are suitable for coating compositions.

Aqueous emulsions of alkyd resins of the above type have been used in the past for coating purposes but have not given complete satisfaction. There is a tendency for the resin to separate irreversibly from the suspending medium. The emulsions themselves and those to which pigments have been added are deficient in good brushing qualities. The paint films produced from such emulsions are relatively slow-drying and soft.

It has now been found that these difficulties can be overcome by incorporating with the drying-oil modified alkyd resin a minor proportion of a resin of the maleic acid-rosin type and emulsifying this mixture in water with the aid of emulsifying agents such as casein.

The emulsions made from such mixed resins have many advantages over those made from a simple drying-oil modified alkyd resin. The particle size of the dispersed resin is considerably smaller than can be obtained from a drying-oil modified alkyd resin by the same treatment. This difference is quite apparent when emulsions of the two types are examined under the microscope. The emulsion made from the drying-oil modified alkyd resin contains particles which are, on the average, about four times as large as those which are obtained under similar conditions from the mixed resin containing both the drying-oil modified alkyd and the maleic acid-rosin resins. This reduction in particle size is due directly to the addition of the maleic acid-rosin resin since with the drying-oil modified alkyd resin alone it is impossible to attain the same small particle size even on passing the emulsion several times through a colloid mill. This may be due to the additional emulsifying effect contributed by the ammonium salt of the maleic acid-rosin resin; also to the increase in viscosity of the aqueous phase contributed by the ammonium salt of the maleic acid-rosin resin. Whatever the explanation may be, it is probable that the distinctive features of the improved product are due mainly to the increase in viscosity and stability brought about by the addition of the maleic acid-rosin resin.

There are several improved properties of the emulsions of the mixed resin which are directly attributable to the presence of the maleic acid-rosin resin. The viscosity of the emulsion of the mixed resin is much greater for a given resin content than that of the simple drying-oil modified alkyd resin. These improved emulsions possess better brushing quality, pigment-binding, and covering power when used as coating compositions. The maleic acid-rosin resin is also responsible for the increased stability of the emulsion and, as a result of this increase in stability, the emulsions of the mixed resin are capable of being stored for long periods of time without suffering phase reversals, large changes in viscosity, growth in particle size, etc.

In addition to these improvements in the emulsion, the final coating, likewise, has improved properties of fundamental importance. The ultimate drying of the film is considerably more rapid. In the case of the simple drying-oil modified alkyd resin emulsions it usually requires an over-night drying period to render the coating tack-free whereas when the maleic acid-rosin product is added this is accomplished in three to four hours. The final film is also harder than those obtained from emulsions of the simple drying-oil modified alkyd resin in which the same amount of drying oil is used. This increased hardness contributes additional protection against mold growth and staining.

The effects of adding the maleic acid-rosin product to the drying-oil modified alkyd seem to be specific for this particular type of resin. They are not obtained with other types such as phenol-formaldehyde, either "rosin modified" or "100%," ester gum, urea-formaldehyde or vinyl resins. No unexpected results are obtained when these types of resin are employed in conjunction with the drying-oil alkyds in the preparation of aqueous emulsions for coating purposes whereas the effects due to the addition of the maleic acid-rosin products were entirely unpredictable.

The alkyd resins employed in the present invention are prepared from a polyhydric alcohol, a polybasic acid and the acids derived from drying-oils, such as linseed, tung, or perilla, with or without admixture with other oils such as soya bean, castor, cottonseed, etc. The preferred resins are made from glycerine, phthalic acid and the acids of linseed or tung oil. The maleic acid-rosin resins are generally prepared by heating maleic anhydride with rosin at 250°–270° C. in the presence of sufficient glycerine to yield a product having an acid number of about 25–35. Various mixtures of maleic anhydride and rosin may be used, the most effective being those containing from 8% to 15% of maleic anhydride.

The properties of the mixed resin will vary according to the amount of the maleic acid-rosin resin present. Larger additions of this type of resin to the drying-oil modified alkyd resin increase the speed of the drying, the stability, and the viscosity of the emulsions produced from such mixed resins. As the proportion of the maleic acid-rosin resin is increased, the amount of casein or other emulsifying agent can be reduced without affecting the ultimate stability of the emulsion. The preferred mixtures are those which contain from 2%–30% of the maleic acid-rosin resin calculated on the total weight of the mixed resin. The emulsions are prepared in general by fusing together the two types of resin and pouring the hot melt into an aqueous solution of the dispersing agent, stirring the resulting emulsion continuously and rapidly throughout the addition. The mixed resins themselves may be prepared by melting the drying-oil modified alkyd resin and dissolving in it the maleic acid-rosin resin which may be added in the solid or molten condition. They may also be made by first preparing a rosin-maleic acid addition product and adding to this the glycerine, fatty acid, and phthalic anhydride in the proper proportions so that on heating, a resin having an acid number of 25–35 is obtained.

The most effective emulsifying agent is a solution of casein peptized with ammonium borate; glue and saponified waxes may be used as additional stabilizing agents if desired. It is not advisable to use solvents in conjunction with the resins in preparing the emulsions as they tend to retard the drying of the film.

The invention may be illustrated by the following examples although it is not limited by the exact ingredients, proportions, etc. as it may be otherwise practiced within the scope of the appended claims.

*Example 1*

The maleic acid-rosin resin is prepared by heating 100 parts by weight of rosin, 15 parts of maleic anhydride and 20 parts of glycerine at 250° C. for approximately eight hours until the acid number of the resin falls below 40. The drying-oil modified alkyd resin is prepared by heating 100 parts of phthalic anhydride, 63 parts of linseed oil fatty acids, 114 parts of soya bean oil fatty acids and 63 parts of glycerine at approximately 240° C. until the acid number of the product is below 15. 100 parts of the drying-oil modified alkyd resin is then melted, to it is added 2 parts of the maleic acid-rosin resin and the mixture is heated to about 150°. This mixture is then allowed to cool to 80°, soluble driers are added (about 0.2% lead and 0.05% cobalt based on the weight of the drying-oil modified alkyd resin) and without further cooling the molten mixture is emulsified in a solution made up of 100 parts of water, 8 parts of casein, 4 parts of the ammonium soap of a saponifiable wax such as montan wax, 2 parts of concentrated (28%) aqueous ammonia and one part of boric acid. The molten resin is poured rather slowly into the aqueous suspension medium which is agitated vigorously during the entire time of mixing. The emulsion thus prepared is very stable, the particles of the disperse phase are extremely fine and it can be kept indefinitely without danger of separation. A small (0.2—0.5%) quantity of a bactericide, such as phenol, may be added to maintain sterile conditions when casein is used.

*Example 2*

Heat 90 parts of the drying-oil modified alkyd resin described in Example 1 to 150° C., add 10 parts of the maleic acid-rosin resin also described in Example 1, cool to 80° and add the soluble driers. This mixed resin (100 parts) is then emulsified in a solution made up of 150 parts of water, 6 parts of casein, 2 parts of an ammonium soap of montan wax, 2 parts of concentrated (28%) aqueous ammonia and 1 part of boric acid. This is a more dilute suspension than that given in Example 1 and also contains less emulsifying agent. In spite of this the viscosities of the two emulsions are practically the same, showing the advantage of a somewhat larger proportion of the maleic acid-rosin resin.

*Example 3*

Using the same drying-oil modified alkyd and maleic acid-rosin resins described in Example 1, 25 parts of the maleic acid-rosin resin is dissolved in 75 parts of the drying-oil modified alkyd resin at 150° C., the mixture cooled to 80° and driers added. This mixture is emulsified in a solution composed of 150 parts of water, 6 parts of casein, 2 parts of aqueous (28%) ammonia and 1 part of boric acid. When using these proportions of maleic acid-rosin and drying-oil modified alkyd resin, it is preferable to omit the ammonium soap of the wax as otherwise the viscosity of the emulsion would be excessively high.

*Example 4*

In the foregoing examples the maleic acid-rosin resin described has a low acid number. Similar results can also be obtained with maleic acid-rosin resins of high acid number. Such a resin is prepared by heating 100 parts of rosin with 14 parts of maleic anhydride at 250° C. for three hours. This resin has an acid number of 190 and melts at 90° C. (capillary tube method). 10 parts of this resin is dissolved in 90 parts of the drying-oil modified alkyd resin described in Example 1 at 150°. The mixture is cooled to 80°, the driers added and is then emulsified in a solution composed of 150 parts of water, 6 parts of casein, 2 parts of an ammonium soap of montan wax, 2 parts of aqueous (28%) ammonia and 1 part of boric acid. An emulsion having practically the same viscosity as that shown in Example 2 is obtained.

*Example 5*

20 parts by weight of rosin and 6 parts of maleic anhydride are heated together at 200° C. for two hours. To this molten mass of rosin-maleic acid addition product there is added 36 parts of linseed oil fatty acids, 27 parts of phthalic anhydride and 24 parts of glycerine and the mixture is heated at 200°–210° C. until a homogeneous resin having an acid number of 25–35 is obtained. Emulsions of this resin may be prepared as described in Example 3.

Paints may be prepared from these emulsions by adding the usual pigments, colors, etc. in the usual manner as, for instance, on a stone mill or in a pony mixer. For example, 100 parts by weight of Titanox B (25% TiO$_2$ and 75% BaSO$_4$) can be mixed with 100 parts of the emulsion made according to Example 1. In order to bring such a paint to brushing consistency, it is necessary to add 35 to 50 parts of water to the pigmented paste. The other emulsions can be used in a similar way and the ratio of pigment to emulsion can be varied to meet the particular use to which the paint is to be put.

These emulsions are particularly useful as coating, sizing, or waterproofing materials especially for application on porous or absorbent surfaces, e. g. paper, leather, fabric, mineral fibres, wallboard, plaster, stucco, tile, concrete, and masonry in general.

It is understood that fumaric acid, the stereoisomer of maleic acid, may be used to replace maleic anhydride in whole or in part in the foregoing examples, for, as is well known in the art, the two acids produce resins of similar properties when reacted with rosin. Whenever the terms "maleic acid-rosin" or "rosin-maleic acid" are used in the specification and claims, it is intended to include the product obtained by heating rosin with one of the group consisting of maleic anhydride, maleic acid and fumaric acid.

I claim:

1. In the manufacture of improved resin emulsions suitable for coating compositions the steps which include melting a water insoluble drying-oil modified alkyd resin, dissolving therein a rosin-maleic acid resin and emulsifying the resultant product in an aqueous medium.

2. In the manufacture of improved resin emulsions suitable for coating compositions the steps which include heating a water insoluble drying-oil modified alkyd resin to about 150° C., dissolving therein a rosin-maleic acid resin, cooling the product to about 80° C. and emulsifying the resultant product in an aqueous medium.

3. The process which comprises fusing together a water insoluble drying-oil modified alkyd resin and a rosin-maleic acid resin and emulsifying the mixed resin in an aqueous medium.

4. The process which comprises fusing together a water insoluble drying-oil modified alkyd resin and a rosin-maleic acid resin and emulsifying the mixed resin in an ammoniacal solution of casein.

5. The process which comprises fusing together a water insoluble drying-oil modified alkyd resin and a rosin-maleic acid resin in the proportion of from about 2 to about 30 parts of the rosin-maleic acid resin to from about 98 to about 70 parts of the drying-oil modified alkyd resin and emulsifying the mixed resin in an aqueous medium.

6. The process which comprises fusing together a water insoluble drying-oil modified glyceryl phthalate and a rosin-maleic acid resin in the proportion of from about 2 to about 30 parts of the rosin-maleic acid resin to from about 98 to about 70 parts of the drying-oil glyceryl phthalate and emulsifying the mixed resin in an aqueous medium.

7. The process which comprises fusing together a water insoluble drying-oil modified glyceryl phthalate and a rosin-maleic acid resin in the proportion of from about 2 to about 30 parts of the rosin-maleic acid resin to from about 98 to about 70 parts of the drying-oil modified glyceryl phthalate and emulsifying the mixed resin in an ammoniacal solution of casein.

8. The process which comprises fusing together a rosin-maleic addition product, glycerine, drying-oil fatty acids and phthalic anhydride at about 200° C. until a resin having an acid number of about 25–35 is obtained, and emulsifying said product in an aqueous medium.

9. The process which comprises fusing together a water insoluble drying-oil modified alkyd resin and a resin resulting from the reaction between rosin and one of the group consisting of maleic anhydride, maleic acid and fumaric acid, and emulsifying the mixed resin in an aqueous medium.

10. A coating composition comprising an aqueous emulsion of a mixed resin composed of from 70 to 98% by weight of a water insoluble drying oil modified alkyd resin of acid number below 15 and from 2 to 30% by weight of a rosin-maleic acid resin of acid number below 40.

11. A coating composition comprising an aqueous emulsion of a mixed resin composed of from 70 to 98% by weight of a water insoluble drying oil modified glycerol phthalate resin of acid number below 15 and from 2 to 30% by weight of a rosin-maleic acid resin of acid number below 40.

HAROLD C. CHEETHAM.